United States Patent [19]

Castera et al.

[11] Patent Number: 4,566,329
[45] Date of Patent: Jan. 28, 1986

[54] VECTORIAL FORCE SENSOR WITH ELASTIC SURFACE WAVES

[75] Inventors: Jean P. Castera, Orsay; Paul L. Meunier, Paris, both of France

[73] Assignee: Thomson CSF, Paris, France

[21] Appl. No.: 692,546

[22] Filed: Jan. 18, 1985

[30] Foreign Application Priority Data

Jan. 27, 1984 [FR] France ................................ 84 01290

[51] Int. Cl.[4] ...................... G01P 15/08; G01N 29/00
[52] U.S. Cl. .................................. 73/597; 73/517 R; 73/862.68; 310/313 B
[58] Field of Search ................ 73/597, 517 R, 862.68, 73/703, 778; 310/313 R, 313 B, 329; 331/65

[56] References Cited

U.S. PATENT DOCUMENTS 4,096,740  6/1978  Sallée .................................... 73/778
4,318,061  3/1982  Castéra et al. ................... 310/313 R
4,515,016  5/1985  Hartemann et al. .............. 73/517 R

FOREIGN PATENT DOCUMENTS 2123554  2/1984  United Kingdom ............. 73/517 R

Primary Examiner—Stephen A. Kreitman
Attorney, Agent, or Firm—Cushman, Darby & Cushman

[57] ABSTRACT

The vectorial force sensor with elastic surface waves according to the invention comprises a mechanical part, for example a lamella, subjected to a stress ($\sigma$). One face of the lamella incorporates transducers maintaining an elastic surface wave. The system according to the invention possesses three magnetic means inducing in the lamella three orthogonal magnetic fields, one of which is parallel to the direction of polarization of the elastic surface wave. Means are provided to make it possible to measure the influence of each magnetic field on the speed of propagation of the elastic surface wave. Such a system can be used particularly in accelerometers.

3 Claims, 5 Drawing Figures

VECTORIAL FORCE SENSOR WITH ELASTIC SURFACE WAVES

BACKGROUND OF THE INVENTION

The present invention relates to force sensors with elastic surface waves, particularly to those incorporating at least one oscillator connected to transducers located on one face of a mechanical part subjected to a force to be measured. It can be used especially in accelerometers and makes it possible to measure a component of the acceleration generating a force on the sensor.

There are known systems, such as those described in French Patent Applications Nos. 83/08,428 and 83/16,993 filed respectively on 20th May 1983 and 25th Oct. 1983 by the Applicant Company, and in these there are, on the surface of the sensor, transducers designed to excite and pick up elastic surface waves, the speed of propagation of which is known to vary as a function of the mechanical stresses in the direction of wave propogation. The sensor is therefore designed so that a force to be measured gives rise to a stress in the direction of wave propogation. To establish a direct known relation between the force to be measured and the stress, the sensor is oriented in such a way that the force to be measured forms a known angle with the direction of propagation of the elastic surface wave. For example, as regards the force sensor which is the subject of Patent Application No. 83/08,428, relating to a sensor with a flexible lamella, in which the stresses measured are bending stresses induced in the lamella, the force to be measured is exerted perpendicularly to the main plane of the lamella, where the bending stresses are detected.

As a result of this, to measure a force of unknown direction, it is necessary to provide means of detecting the direction of the force and of orienting the sensor in an appropriate way. For example, where an accelerometer is concerned, a ballast system associated with the sensor must be provided, to ensure that the effect of the acceleration is to put the sensor in the proper position and that the stress measured can be interpreted and give the acceleration value.

The vectorial force sensor according to the invention makes it possible to measure the three components of a force of unknown direction according to a specific trihedron, without having to orient the sensor, thereby making it possible to do without any balancing systems.

BRIEF SUMMARY OF THE INVENTION

The invention therefore relates to a vectorial force sensor with elastic surface waves, which comprises: a bar on which is exerted a stress to be measured and which possesses a measuring face; an assembly of oscillator means for elastic surface waves, arranged on the measuring face and maintaining an elastic wave of specific polarization direction; the said force sensor being defined in that it also incorporates: at least three magnetic means inducing magnetic fields in the bar, the first means inducing a first magnetic field parallel to the direction of polarization of the elastic surface wave, the second means inducing the second magnetic field perpendicular to the direction of polarization of the elastic wave and parallel to the measuring face, and the third means inducing a third magnetic field perpendicular to the measuring face; a sequential control circuit making it possible to control the magnetic means sequentially; measuring means connected to each measuring oscillator means and supplying results of measurement of the propagation speed of the elastic waves during each operating sequence provided by the sequential control circuit, process circuits receiving the results of measurement of the propagation speeds and providing the vectorial value of the stress exerted on the bar.

BRIEF DESCRIPTION OF THE DRAWINGS

The invention will be understood more clearly and other characteristics and advantages will emerge with the aid of the following description made with reference to the attached Figures in which.

DETAILED DESCRIPTION OF THE PREFERRED EMBODIMENTS

Figure 1:
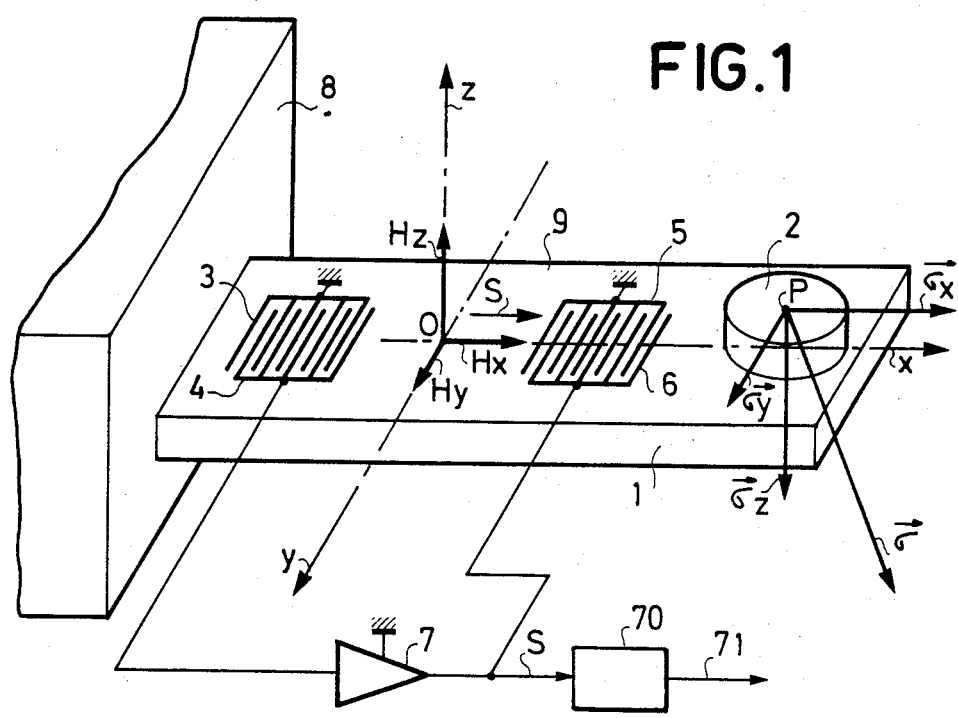
FIG. 1 illustrates an explanatory diagram of the force sensor according to the invention.

With reference to FIG. 1, the operation of the vectorial force sensor according to the invention will be described first.

This sensor possesses a lamella 1 made of a ferromagnetic material. This lamella is embedded at one of its ends in a supporting wall 8. At its opposite end, it has a weight 2 making it possible to exert a force $\vec{\sigma}$ the end of the lamella 1.

The face 9 of the lamella 1 is equipped with interdigitated electrodes 3-4 and 5-6. These electrodes delim radiating gaps. The electrodes 3 and 4 form a transducer emitting elastic surface waves which travel in the direction Ox, before being picked up by electrodes 5-6 constituting the receiving transducer. The electrodes 3 and 5 are grounded. The electrodes 4 and 6 are connected respectively to the input and output of an amplifier 7. The conductive elements carried by the face 9 form a delay line for elastic surface waves, which acts as a loop for the amplifier 7. The assembly as a whole constitutes an oscillator, the oscillation frequency of which depends on the transit time of the surface waves exchanged between the emitting transducer (3–4) and the receiving transducer (5–6).

A reading device 70 connected to the output S of the amplifier 7 makes it possible to read the oscillation frequency and transmits a signal of corresponding value at its output 71.

Under the effect of the force $\vec{\sigma}$ exerted by the weight 2 on the lamella 1, a stress is generated on the surface of the lamella. Such a stress is known to have an influence on the propagation speed of the elastic waves on the surface of the lamella 1 and therefore on the oscillation frequency of the system.

If the stress generated in the lamella is in the plane of the surface 9 and along the surface-wave propagation axis, the frequency variation is proportional to the stress. It is therefore sufficient to measure the frequency of the elastic waves before and after the stress is applied, in order to measure the force exerted.

However, this method is inadequate when the direction of the stress applied is not known.

The invention therefore envisages inducing three magnetic fields Hx, Hy and Hz in the lamella 1.

If S is considered to be the direction of polarization of the elastic surface wave maintained by transducers 3-4 and 5-6, this direction S is parallel to one axis Ox of a reference trihedron Oxyz. The magnetic fields Hx, Hy and Hz are induced in the directions Ox, Oy and Oz respectively. In the system according to the invention, these magnetic fields precisely define the reference trihedron Oxyz.

As seen above, a stress induced in the lamella 1 of the sensor causes a variation in the speed of the elastic surfave waves which exist on the surface 9 of the lamella. A variation in magnetic field likewise gives rise to a variation in the speed of the elastic surface waves. It follows from this that the frequency of the oscillator of the sensor of FIG. 1, which is linked to the propagation speed of the elastic surface waves, varies with a stress exerted on the lamella and with an induced magnetic field.

If the field Hx is given a specific value, a few tens of oersteds, for example 50 oersteds, and the fields Hy and Hz are given zero values, and if the value of the mechanical stress $\vec{\sigma}$ exerted on the end of the lamella 1 of the sensor is varied, it is revealed that the variation in the frequency of the elastic surface wave varies linearly with the stress.

The system according to the invention makes use of the abovementioned observations. In fact, if the field Hy and then the field Hz are given specific values in succession, whilst the value of the other fields is cancelled, similar results are obtained.

Figure 2:
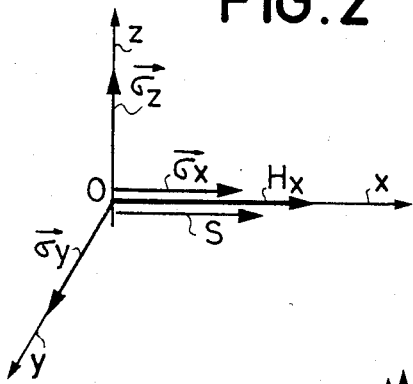
FIGS. 2, 3 and 4 represent graphs explaining the various operating modes of the sensor according to the invention.
Figure 3:
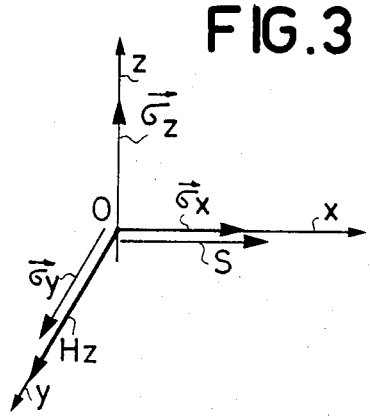
Figure 4:
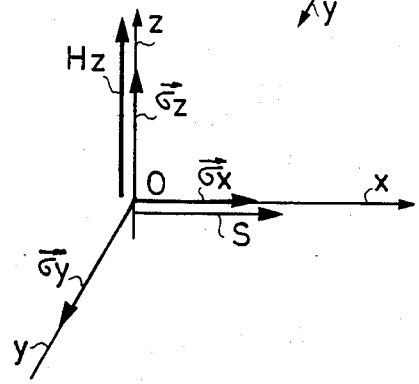

FIGS. 2 to 4 illustrate, on a reference trihedron Oxyz, the three components $\vec{\sigma_x}$, $\vec{\sigma_y}$, $\vec{\sigma_z}$ of the stress exerted on the sensor of FIG. 1. The direction of polarization of the surface wave $\vec{\sigma S}$ is also shown.

When a magnetic field Hx parallel to S is induced, as shown in FIG. 2, the value of the variation in the oscillation frequency of the circuit of the sensor of FIG. 1 is:

$$\left(\frac{\Delta F}{F}\right)_1 = \left(a\, \sigma_x + \beta\, \sqrt{\sigma_y^2 + \sigma_z^2}\right) Hx$$

The coefficients $\alpha$ and $\beta$ are characteristic coefficients of the material constituting the Lamella 1. Since the value of Hx is known, this relation can therefore be written as follows:

$$\left(\frac{\Delta F}{F}\right)_1 = a\, \sigma_x + b\, \sqrt{\sigma_y^2 + \sigma_z^2} \quad (1)$$

with a $= \alpha Hx$
and b $= \beta Hx$

When a magnetic field Hy oriented perpendicularly to S and parallel to the plane y0z is induced, the value of the variation in the oscillation frequency of the sensor circuit is:

$$\left(\frac{\Delta F}{F}\right)_2 = (\gamma\, \sigma_x + \delta\, \sigma_y + \epsilon\, \sigma_z) Hy$$

The coefficients $\gamma$, $\beta$ and $\epsilon$ are likewise characteristic coefficients of the material constituting the lamella 1. It is therefore possible to write:

$$\left(\frac{\Delta F}{F}\right)_2 = c_1\, \sigma_x + d_1\, \sigma_y + e_1\, \sigma_z \quad (2)$$

with:
$c_1 = \gamma Hy$
$d_1 = \beta Hy$
$e_1 = \epsilon Hy$

Finally, when a magnetic field Hz perpendicular to the magnetic fields Hx and Hy is induced, the variation in the oscillation frequency of the sensor circuit is written:

$$\left(\frac{\Delta F}{F}\right)_3 = (\gamma\, \sigma_x + \gamma\, \sigma_y + \epsilon\, \sigma_z) Hz \quad (3)$$

or $$\left(\frac{\Delta F}{F}\right)_3 = c_2\, \sigma_x + d_2\, \sigma_y + e_2\, \sigma_z$$

with:
$c_2 = \gamma Hz$
$d_2 = \delta Hz$
$e_2 = \epsilon Hz$

The three relations (1), (2) and (3) given above constitute a system of equations with three unknowns.

In fact, for a specific mechanical stress, on each magnetic field Hx, Hy, Hz applied in succession the corresponding frequency variation $$\left(\frac{\Delta F}{F}\right)_1, \left(\frac{\Delta F}{F}\right)_2, \left(\frac{\Delta F}{F}\right)_3$$

resulting from the magnetic field applied is measured. The system of equations then makes it possible to compute the values of the components $\vec{\sigma_x}$, $\vec{\sigma_y}$, $\vec{\sigma_z}$ of the mechanical stress. This produces the vectorial value of the stress $\vec{\sigma}$ in the trihedron Oxyz, of which the orientation in space is known.

An exemplary embodiment of the invention will be described with reference to FIG. 5.

As described in French Patent Application No. 83 08,428, the lamella 1 has been placed on two pivots 10 and 11 which determine a zone of equal stress in the lamella 1. The forces to be measured are exerted by two weights 12 and 13. The transducers 3–4 and 5–6 are identical to those of FIG. 1. The electrical circuits connected to these transducers (amplifiers 7 and a reading device 70) are those of FIG. 1 and have not been reproduced in FIG. 5.

The emitting transducer 3–4 emits an elastic wave, the polarization direction of which is known and determines the axis Ox. A first magnetic-field inductor device is placed along this axis Ox and makes it possible to induce a magnetic field Hx in the lamella. This inductor device can be, for example, two Helmholtz coils 20 and 21 connected in series by means of connecting conductors (not shown) and supplied between conductors 30 and 31.

A second inductor device consisting, for example, of the two Helmholtz coils 22 and 23 is placed so as to induce a magnetic field Hy oriented in the plane of the lamella 1 and perpendicularly to the axis Ox. This field Hy thus defines the axis Oy and consequently the axis Oz.

A third inductor device consisting, for example, of the two Helmholtz coils 24 and 25 is placed so as to induce a magnetic field along the axis Oz.

Like the coils 20 and 21, the coils 22 and 23 on the one hand and the coils 24 and 25 on the other hand are connected in series by means of connections (not shown).

A supply device 26 allows current to be supplied to the coils 20 and 21 via the conductors 30 and 31, to the coils 22 and 23 via the conductors 32 and 33 and to the coils 24 and 25 via the conductors 34 and 35.

A sequential control circuit 27 delivers in succession time pulses t1, t2 and then t3 and controls the supply device 26.

A process circuit 28 receives the time pulses t1, t2, t3. It also receives via the connection 71 the measurement results supplied by the measuring device 70 of FIG. 1.

When a force is exerted by the flyweights 12 and 13 on the lamella 1, to measure this force the sequential control circuit 27 controlled by means (not shown) delivers a first time pulse t1. This pulse t1 controls the supply of current to the coils 20 and 21 via the supply circuit 26 and the conductors 30 and 31. A magnetic field Hx is induced along the axis Ox. The speed of the elastic surface wave maintained between the transducers 3-4 and 5-6 varies. The oscillation frequency detected by the device 70 of FIG. 1 also varies. The value of the signal at the output 71 changes.

Moreover, before the pulse t1 or at the start of this pulse, the process circuit 28 records the value of the signal at the connection 71. During the pulse t1, the process circuit 28 records the new value of the signal received via the connection 71; it computes the difference between the two signals, representing the frequency variation $$\left(\frac{\Delta F}{F}\right)_1,$$

and stores the value of the result.

The sequential control circuit 27 subsequently delivers a pulse t2 which serves to control the supply of current to the coils 22 and 23 and to induce a magnetic field Hy along the axis Oy. The process circuit 28 likewise computes the value of the frequency variation $$\left(\frac{\Delta F}{F}\right)_2$$

and stores this value.

Finally, the sequential control circuit 27 delivers a pulse t3 which causes a magnetic field Hz to be induced along the axis Oz. The computation circuit determines the value of the frequency variation $$\left(\frac{\Delta F}{F}\right)_3.$$

The three values of the frequency variations $$\left(\frac{\Delta F}{F}\right)_1, \left(\frac{\Delta F}{F}\right)_2 \text{ and } \left(\frac{\Delta F}{F}\right)_3$$

are used by the computation circuit to compute, by means of the three relations (1), (2) and (3) mentioned above, the values of the three components $\vec{\sigma}_x, \vec{\sigma}_y, \vec{\sigma}_z$ of the stress exerted on the lamella 1, along the axes Ox, Oy and Oz. These three components thus determine the required mechanical stress $\vec{\sigma}$ in terms of its direction, sense and value.

Figure 5:
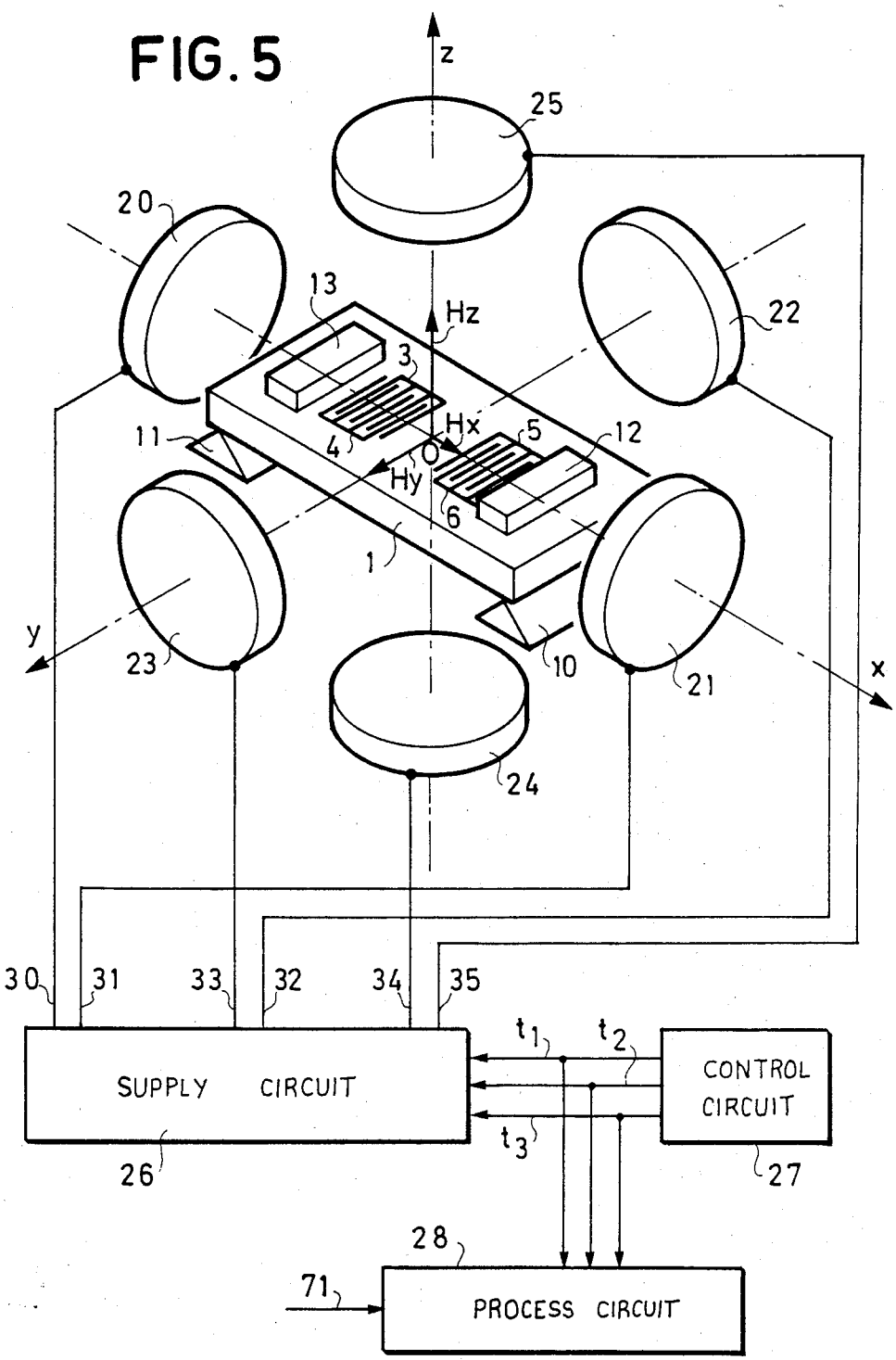
FIG. 5 shows an example of a force sensor according to the invention.

According to the exemplary embodiment of FIG. 5, the lamella 1 is placed on the supports 10 and 11 in such a way that it is preferably subjected to bending stress. The system according to the invention can be used for any other mode of operation and makes it possible to measure any other type of stress, whether it acts in the form of compression, extension or torsion. In this case, the lamella 1 can have any form other than that shown in FIGS. 1 and 5, depending on the type of stress which it is to undergo.

What is claimed is:

1. A vectorial force sensor with elastic surface waves, comprising a bar on which is exerted a stress to be measured and which possesses a measuring face; an assembly of oscillator means for elastic surface waves, arranged on the measuring face and maintaining an elastic wave of specific polarization direction (S); the said force sensor also incorporating: at least three magnetic means inducing magnetic fields in the bar, the first means inducing a first magnetic field (Hx) parallel to the direction of polarization (S) of the elastic surface wave, the second means inducing a second magnetic field (Hy) perpendicular to the direction of polarization (S) of the elastic wave and parallel to the measuring face, and the third means inducing a third magnetic field (Hz) perpendicular to the measuring face; a sequential control circuit making it possible to control the magnetic means sequentially; and measuring means connected to each measuring oscillator means and supplying results of measurement of the propagation speed of the elastic waves for each operating sequence provided by the sequential control circuit, process circuits receiving the results of measurement of the propagation speeds and supplying the vectorial value of the stress exerted on the bar on the basis of a vectorial combination of the three measurements.

2. A vectorial force sensor as claimed in claim 1, wherein, the directions of the first, second and third magnetic fields (Hx, Hy, Hz) induced in the bar determining three axes of a reference trihedron (Oxyz), the computation circuits are connected to this trihedron, in such a way that they determine the vectorial values of the components of the stress to be measured, along the three axes (Ox, Oy, Oz) of the trihedron, and consequently the vectorial value of the said stress.

3. A vectorial force sensor as claimed in claim 1, wherein each magnetic means consists of two Helmholtz coils located on either side of the bar and supplied in series by means of a supply circuit, the operation of which is controlled by the sequential control circuit.

* * * * *